US012230933B2

(12) United States Patent
Takeuchi et al.

(10) Patent No.: US 12,230,933 B2
(45) Date of Patent: Feb. 18, 2025

(54) TERMINAL AND WIRE WITH TERMINAL

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shunya Takeuchi, Mie (JP); Teruo Hara, Mie (JP); Hajime Matsui, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 348 days.

(21) Appl. No.: 17/909,431

(22) PCT Filed: Mar. 8, 2021

(86) PCT No.: PCT/JP2021/008880
§ 371 (c)(1),
(2) Date: Sep. 5, 2022

(87) PCT Pub. No.: WO2021/182373
PCT Pub. Date: Sep. 16, 2021

(65) Prior Publication Data

US 2023/0137240 A1 May 4, 2023

(30) Foreign Application Priority Data

Mar. 12, 2020 (JP) ................................ 2020-043008

(51) Int. Cl.
*H01R 4/26* (2006.01)
*H01R 4/50* (2006.01)
*H01R 11/11* (2006.01)

(52) U.S. Cl.
CPC ............ *H01R 4/5083* (2013.01); *H01R 4/26* (2013.01); *H01R 11/11* (2013.01)

(58) Field of Classification Search
CPC ........ H01R 11/11; H01R 4/05; H01R 4/5083; H01R 13/424
See application file for complete search history.

(56) References Cited

U.S. PATENT DOCUMENTS 7,306,495 B2 12/2007 Hashimoto et al.
2019/0252803 A1 * 8/2019 Takeuchi ............ H01R 13/424

FOREIGN PATENT DOCUMENTS

JP H07-326415 A 12/1995
JP 2019204747 A * 11/2019 ............ H01R 11/11
WO 2019/159730 A1 8/2019

OTHER PUBLICATIONS

International Search Report issued on Apr. 27, 2021 for WO 2021/182373 A1 (4 pages).

* cited by examiner

*Primary Examiner* — Tulsidas C Patel
*Assistant Examiner* — Carlos E Lopez-Pagan
(74) *Attorney, Agent, or Firm* — Venjuris, P.C.

(57) ABSTRACT

A terminal to be connected to a front end part of a wire includes a terminal body and a slide portion. The terminal body includes a sandwiching portion for sandwiching the wire. The slide portion has a tubular shape to be externally fit to the terminal body and includes a pressurizing portion projecting inward from an inner surface of the slide portion. The slide portion is slidable with respect to the terminal body between a non-contact position where the pressurizing (Continued)

portion is not in contact with the sandwiching portion and a contact position forward of the non-contact position, the pressurizing portion being in contact with the sandwiching portion at the contact position. The slide portion has a lower wall, a first side wall extending upward from one side edge of the lower wall and a second sandwiching portion extending upward from the other side edge of the lower wall.

7 Claims, 10 Drawing Sheets

TERMINAL AND WIRE WITH TERMINAL

CROSS REFERENCE TO RELATED APPLICATIONS

This application is a national phase of PCT application No. PCT/JP2021/008880, filed on 8 Mar. 2021, which claims priority from Japanese patent application No. 2020-043008, filed on 12 Mar. 2020, all of which are incorporated herein by reference.

TECHNICAL FIELD

The present disclosure relates to a terminal and a wire with terminal.

BACKGROUND

Conventionally, a wire with terminal is known in which a terminal is connected to a core wire exposed from an end of a wire. Such a terminal may include, for example, a crimping portion to be crimped to the core wire exposed form the end of the wire from outside.

The above terminal is crimped to the wire, for example, as follows. First, a metal plate material is press-worked to form the terminal having a predetermined shape. Subsequently, the terminal is placed on a placing part of a lower die located on a lower side, out of a pair of dies relatively movable in a vertical direction. Subsequently, the core wire exposed from the end of the wire is placed on the crimping portion of the terminal. Thereafter, one or both of the pair of dies are moved in directions toward each other, and the crimping portion is sandwiched between a crimping part of the upper die and the placing part of the lower die, whereby the crimping portion is crimped to the core wire of the wire. In the above way, the terminal is connected to the end of the wire (see Patent Document 1).

PRIOR ART DOCUMENT

Patent Document

Patent Document 1: JP 2005-050736 A

SUMMARY OF THE INVENTION

Problems to be Solved

In the case of sandwiching and connecting the core wire instead of the above crimping portion, the terminal is possibly composed of two components including a terminal body and a slide portion disposed behind the terminal body. In this case, there is a concern that troubles such as the deformation of the slide portion by a force applied to the slide portion occur in pushing and sliding the slide portion.

The present disclosure was completed on the basis of the above situation and aims to provide a terminal improved in the strength of a slide portion.

Means to Solve the Problem

The present disclosure is directed to a terminal to be connected to a front end part of a wire, the terminal including a terminal body and a slide portion, wherein the terminal body includes a sandwiching portion for sandwiching the wire, the slide portion has a tubular shape to be externally fit to the terminal body, the slide portion includes a pressurizing portion projecting inward from an inner surface of the slide portion, the slide portion is slidable with respect to the terminal body between a non-contact position where the pressurizing portion is not in contact with the sandwiching portion and a contact position forward of the non-contact position, the pressurizing portion being in contact with the sandwiching portion at the contact position, the slide portion has a lower wall, a first side wall extending upward from one side edge of the lower wall and a second sandwiching portion extending upward from the other side edge of the lower wall, a first upper wall extending toward the second side wall via a bent first bent portion is formed on an upper end part of the first side wall and a second upper wall extending toward the first side wall via a bent second bent portion is formed at a position forward of the first upper wall on an upper end part of the second side wall, the first upper wall is formed with a projecting portion projecting outward, and a rear holding portion for receiving a force pushing the projecting portion of the first upper wall from behind is provided on a rear end edge of the second upper wall or a rear end edge of the second bent portion.

Effect of the Invention

According to the present disclosure, it is possible to improve the strength of a slide portion.

DETAILED DESCRIPTION TO EXECUTE THE INVENTION

Description of Embodiments of Present Disclosure

Figure 1:
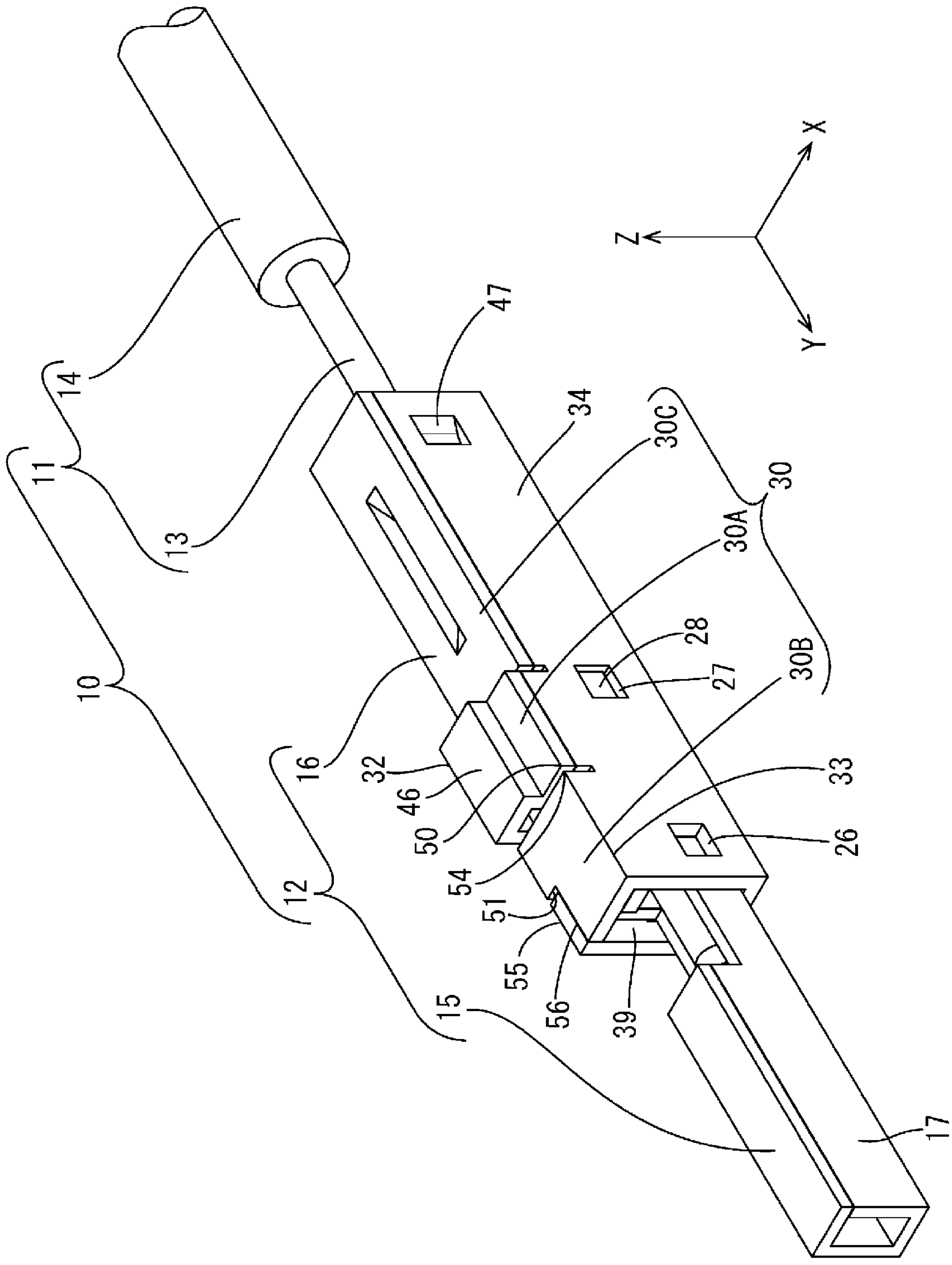
FIG. 1 is a perspective view showing a wire with terminal according to one embodiment.

First, embodiments of the present disclosure are listed and described.

(1) The present disclosure is directed to a terminal to be connected to a front end part of a wire, the terminal including a terminal body and a slide portion, wherein the terminal body includes a sandwiching portion for sandwiching the wire, the slide portion has a tubular shape to be externally fit to the terminal body, the slide portion includes a pressurizing portion projecting inward from an inner surface of the slide portion, the slide portion is slidable with respect to the terminal body between a non-contact position where the pressurizing portion is not in contact with the sandwiching portion and a contact position forward of the non-contact position, the pressurizing portion being in contact with the sandwiching portion at the contact position, the slide portion has a lower wall, a first side wall extending upward from one side edge of the lower wall and a second sandwiching portion extending upward from the other side edge of the lower wall, a first upper wall extending toward the second side wall via a bent first bent portion is formed on an upper end part of the first side wall and a second upper wall extending toward the first side wall via a bent second bent portion is formed at a position forward of the first upper wall on an upper end part of the second side wall, the first upper wall is formed with a projecting portion projecting outward, and a rear holding portion for receiving a force pushing the projecting portion of the first upper wall from behind is provided on a rear end edge of the second upper wall or a rear end edge of the second bent portion.

If the projecting portion is pushed forward by a jig, the first upper wall provided with the projecting portion is pushed forward. Then, a force applied to the first upper wall when the jig pushes the projecting portion forward is received by the rear holding portion of the second upper wall. In this way, the strength of the slide portion can be improved.

(2) Preferably, the rear holding portion includes a rear end edge of the second bent portion, and an end part on the second side wall side, out of a front end edge of the first upper wall, serves as a first contact portion for contacting the rear end edge of the second bent portion when the projecting portion of the first upper wall is pushed from behind.

If the projecting portion is pushed forward from behind by the jig, the first upper wall moves to turn when viewed from above since a rear end part of the first bent portion functions like a support point. In this way, the first contact portion formed on the second side wall side, out of the front end edge of the first upper wall, comes into contact with the rear holding portion of the second upper wall from behind. Since the second bent portion is bent, the strength of the second bent portion is higher than those of the second side wall and the second upper wall. In this way, the strength of the slide portion can be improved.

(3) Preferably, a front holding portion projecting upward is formed at a position forward of the first bent portion on an upper end edge of the first side wall, a second contact portion is provided behind the front holding portion on the second upper wall, and a force applied to the rear holding portion of the second upper wall is received by the second contact portion coming into contact with the front holding portion from behind.

If a force is applied to the rear holding portion from behind, the second upper wall moves to turn when viewed from above since a rear end part of the second bent portion functions like a support point. In this way, the second contact portion formed on the second side wall side, out of the second upper wall, comes into contact with the front holding portion of the first upper wall from behind. Since a force received by the second contact portion is received by the front holding portion in this way, the strength of the slide portion can be improved.

(4) Preferably, the projecting portion is formed near the first bent portion.

If the projecting portion is pushed forward from behind by the jig, the first upper wall moves to turn when viewed from above since the rear end part of the first bent portion functions like a support point. Since the projecting portion is formed near the first bent portion functioning like the support point, the first upper wall hardly rotates when the projecting portion is pushed from behind. In this way, the strength of the slide portion can be improved.

(5) Preferably, the projecting portion is formed by bending the first upper wall.

Since the projecting portion is formed by bending the first upper wall, a part where a thickness of a metal plate material constituting the projecting portion is thinner than other parts is hardly formed. Since the strength of the projecting portion can be improved in this way, the strength of the slide portion can be improved.

(6) Preferably, the slide portion has a third upper wall behind the first upper wall, and the third upper wall is provided with a pressurizing portion.

If the projecting portion formed on the first upper wall is pushed from behind, a force applied to this projecting portion is received by the second upper wall located forward of the first upper wall. On the other hand, by providing the third upper wall with the pressurizing portion for pressing the sandwiching portion, a force applied from the sandwiching portion to the pressurizing portion is received by the third upper wall. In this way, a force applied to the slide portion can be dispersed as compared to the case where a force received by the projecting portion and a force received by the pressurizing portion are received by one upper wall. In this way, the strength of the slide portion can be improved.

(7) The present disclosure is directed to a wire with terminal including any one of the above terminals and a wire to be connected to the terminal.

DETAILS OF EMBODIMENT OF PRESENT DISCLOSURE

An embodiment of the present disclosure is described below. The present disclosure is not limited to these illustrations and is intended to be represented by claims and include all changes in the scope of claims and in the meaning and scope of equivalents.

Embodiment

One embodiment of the present disclosure is described with reference to FIGS. 1 to 10. A wire with terminal 10 according to this embodiment includes a wire 11 and a terminal 12 connected to the wire 11. The terminal 12 is connected to an unillustrated mating terminal. The terminal 12 is connected to a front end part in an extending direction (direction indicated by an arrow Y) of the wire 11 as shown in FIG. 1. In the following description, a direction indicated by an arrow Z is referred to as an upward direction, the direction indicated by the arrow Y is referred to as a forward direction and a direction indicated by an arrow X is referred to as a leftward direction. Note that, for a plurality of identical members, only some members may be denoted by a reference sign and the other members may not be denoted by the reference sign.

[Wire 11]

As shown in FIG. 1, the wire 11 is disposed to extend in a front-rear direction. The wire 11 is such that the outer periphery of a core wire 13 is surrounded by an insulation coating 14 made of insulating synthetic resin. The core wire 13 according to this embodiment is constituted by one metal wire. Note that the core wire 13 may be a stranded wire obtained by twisting a plurality of metal thin wires. An arbitrary metal such as copper, copper alloy, aluminum or aluminum alloy can be appropriately selected if necessary as a metal constituting the core wire 13. The core wire 13 according to this embodiment is made of copper or copper alloy.

[Terminal 12]

As shown in FIG. 1, the terminal 12 includes a terminal body 15 made of metal and a slide portion 16 relatively slidable with respect to the terminal body 15.

[Terminal Body 15]

The terminal body 15 is formed into a predetermined shape by a known method such as press-working, cutting or casting. An arbitrary metal such as copper, copper alloy, aluminum, aluminum alloy or stainless steel can be appropriately selected if necessary as a metal constituting the terminal body 15. The terminal body 15 according to this embodiment is made of copper or copper alloy. A plating layer may be formed on the surface of the terminal body 15. An arbitrary metal such as tin, nickel or silver can be appropriately selected if necessary as a metal constituting the plating layer. Tin plating is applied to the terminal body 15 according to this embodiment.

Figure 2:
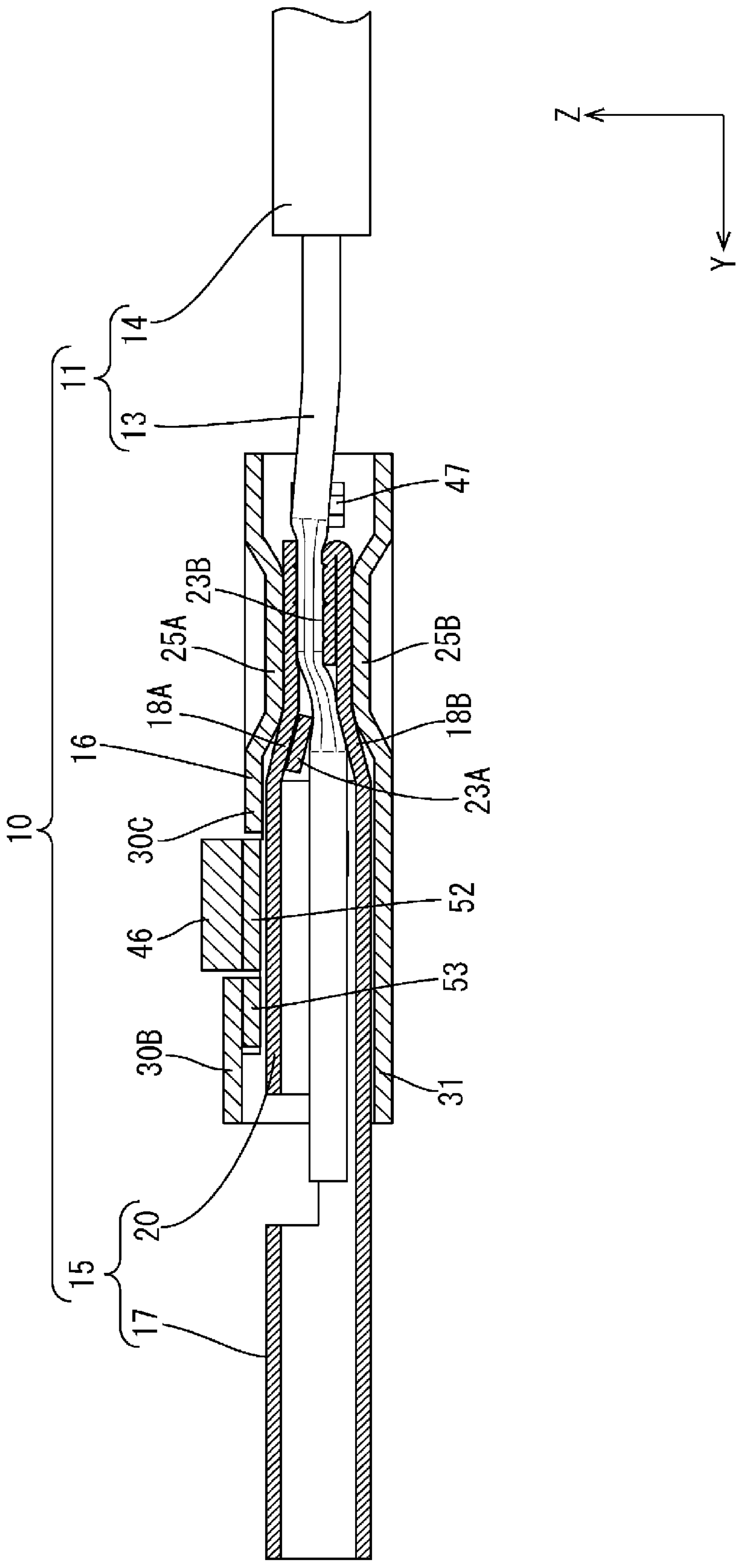
FIG. 2 is a side view in section showing the wire with terminal.

As shown in FIG. 2, the terminal body 15 includes a tube portion 17, into which the plate-like mating terminal is insertable, and a wire connecting portion 20 located behind the tube portion 17 and to be connected to the wire 11. As shown in FIG. 2, the wire connecting portion 20 includes an upper sandwiching portion 18A and a lower sandwiching portion 18B extending rearward. The terminal 12 according to this embodiment is a so-called female terminal and the mating terminal is a so-called male terminal.

As shown in FIG. 2, the tube portion 17 is in the form of a rectangular tube extending in the front-rear direction. The front end of the tube portion 17 is open, so that that the mating terminal is insertable. A resiliently deformable resilient contact piece (not shown) is provided inside the tube portion 17. The resilient contact piece projects inward from an inner wall of the tube portion 17 and extends in the front-rear direction. The mating terminal inserted into the tube portion 17 presses and resiliently deforms the resilient contact piece. The mating terminal is sandwiched between the inner wall of the tube portion 17 and the resilient contact piece by a resilient force of the resiliently deformed resilient contact piece. In this way, the mating terminal and the terminal 12 are electrically connected.

As shown in FIG. 2, the wire connecting portion 20 in the form of a rectangular tube is provided behind the tube portion 17. The upper sandwiching portion 18A (an example of a sandwiching portion) is provided to extend rearward in a rear end part of the upper wall of the wire connecting portion 20, and the lower sandwiching portion 18B (an example of the sandwiching portion) is provided to extend rearward in a rear end part of the lower wall of the wire connecting portion 20. The upper and lower sandwiching portions 18A, 18B have a shape elongated in the front-rear direction. Lengths in the front-rear direction of the upper and lower sandwiching portions 18A, 18B are substantially equal.

As shown in FIG. 2, an upper holding protrusion 23A projecting downward is provided at a position forward of a rear end part on the lower surface of the upper sandwiching portion 18A. A lower holding protrusion 23B projecting upward is provided in a rear end part of the upper surface of the lower sandwiching portion 18B. The lower and upper holding protrusions 23B, 23A are provided at positions shifted in the front-rear direction.

The lower surface of the upper sandwiching portion 18A and the upper surface of the lower sandwiching portion 18B bite into an oxide film formed on the surface of the core wire 13 and peel off the oxide film, whereby a metal surface of the core wire 13 is exposed. By the contact of this metal surface with the upper and lower sandwiching portions 18A, 18B, the core wire 13 and the terminal body 15 are electrically connected.

Figure 3:
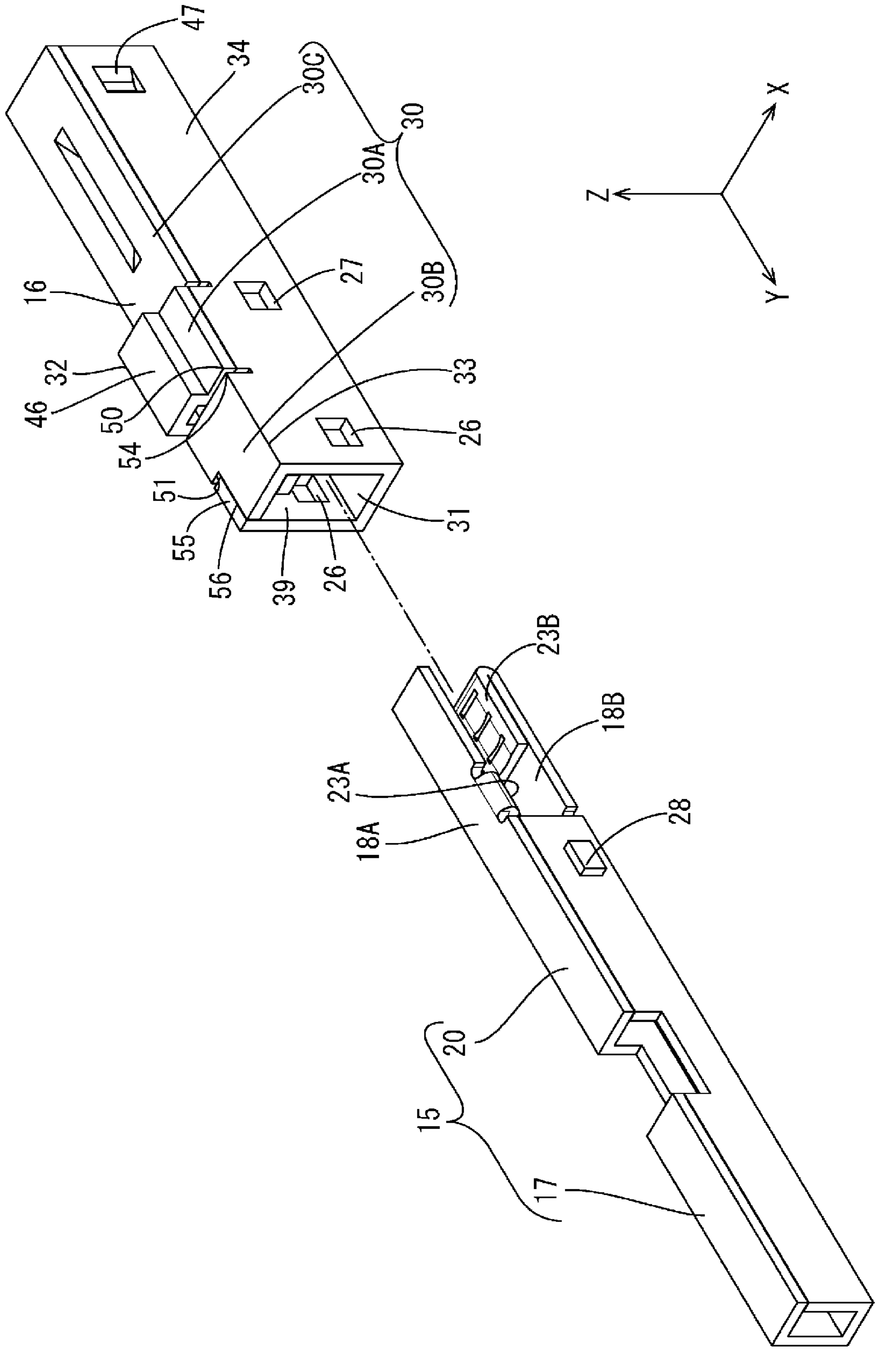
FIG. 3 is an exploded perspective view showing a terminal body and a slide portion.

As shown in FIG. 3, locking projections 28 projecting outward are formed on side walls of the terminal body 15. These locking projections 28 are locked to partial lock receiving portions 26 and full lock receiving portions 27 to be described later to hold the slide portion 16 at a partial locking position (an example of a non-contact position) and a full locking position (an example of a contact position).

[Slide Portion 16]

As shown in FIG. 3, the slide portion 16 is in the form of a rectangular tube extending in the front-rear direction. The slide portion 16 is formed by press-working a metal plate material into a predetermined shape. An arbitrary metal such as copper, copper alloy, aluminum, aluminum alloy or stainless steel can be appropriately selected if necessary as a metal constituting the slide portion 16. Although not particularly limited, the slide portion 16 according to this embodiment is made of stainless steel. A plating layer may be formed on the surface of the slide portion 16. An arbitrary metal such as tin, nickel or silver can be appropriately selected if necessary as a metal constituting the plating layer.

As shown in FIG. 2, an inner cross-sectional shape of the slide portion 16 is equal to or somewhat larger than an outer cross-sectional shape of a region of the terminal body 15 where the upper and lower sandwiching portions 18A, 18B are provided. In this way, the slide portion 16 is disposed outside the region of the terminal body 15 where the upper and lower sandwiching portions 18A, 18B are provided.

Figure 4:
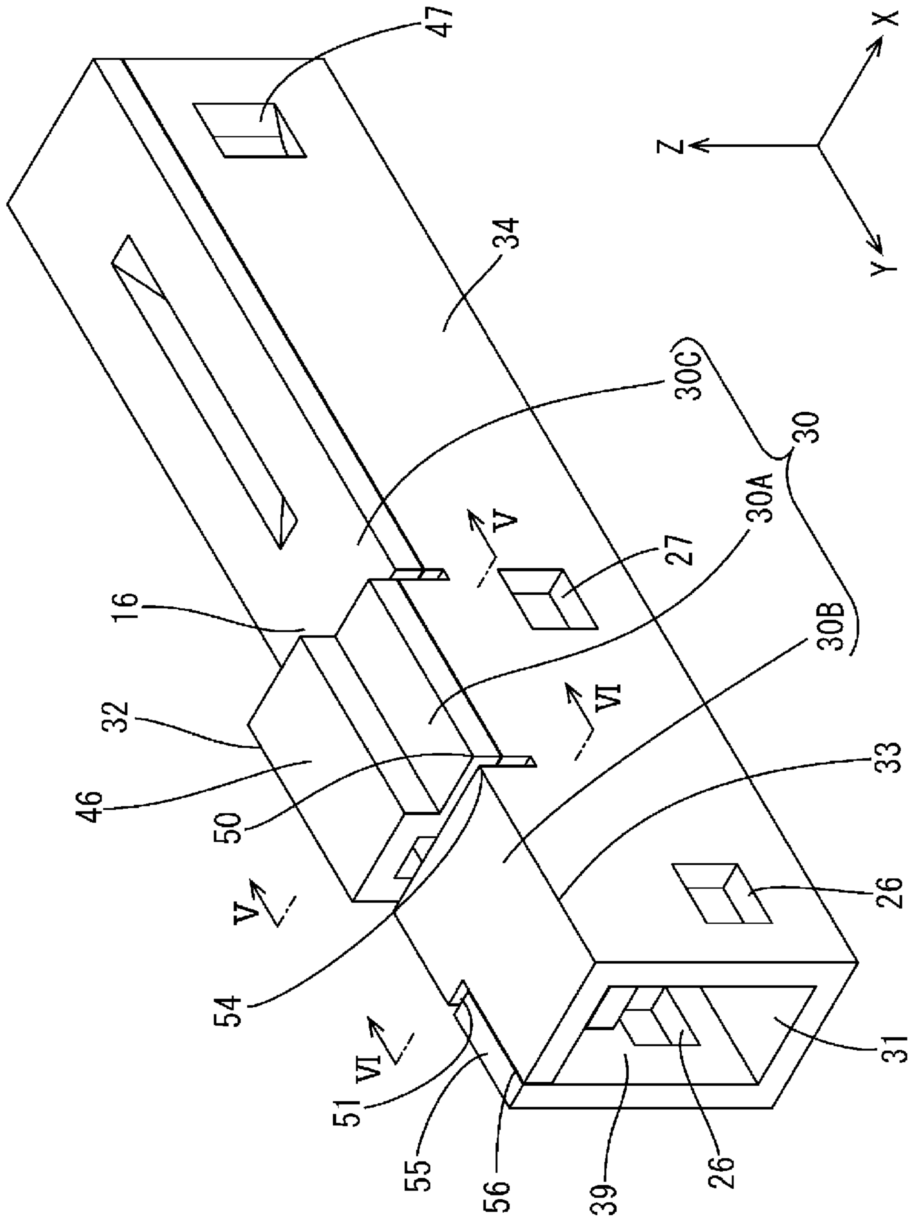
FIG. 4 is a perspective view showing the slide portion.

As shown in FIG. 4, the slide portion 16 has a lower wall 31, a right side wall 39 (an example of a first side wall) extending upward from the right side edge of the lower wall 31, a left side wall 34 (an example of a second side wall) extending upward from the left side edge of the lower wall 31, and an upper wall 30 covering a space formed by the lower wall 31 and the right and left side walls 39, 34.

As shown in FIG. 4, the upper wall 30 of the slide portion 16 is divided into three parts in the front-rear direction. Out of the upper wall 30, a part located near a center in the front-rear direction serves as a first upper wall 30A. A second upper wall 30B is provided in front of the first upper wall 30A. A third upper wall 30C is provided behind the first upper wall 30A.

Figure 5:
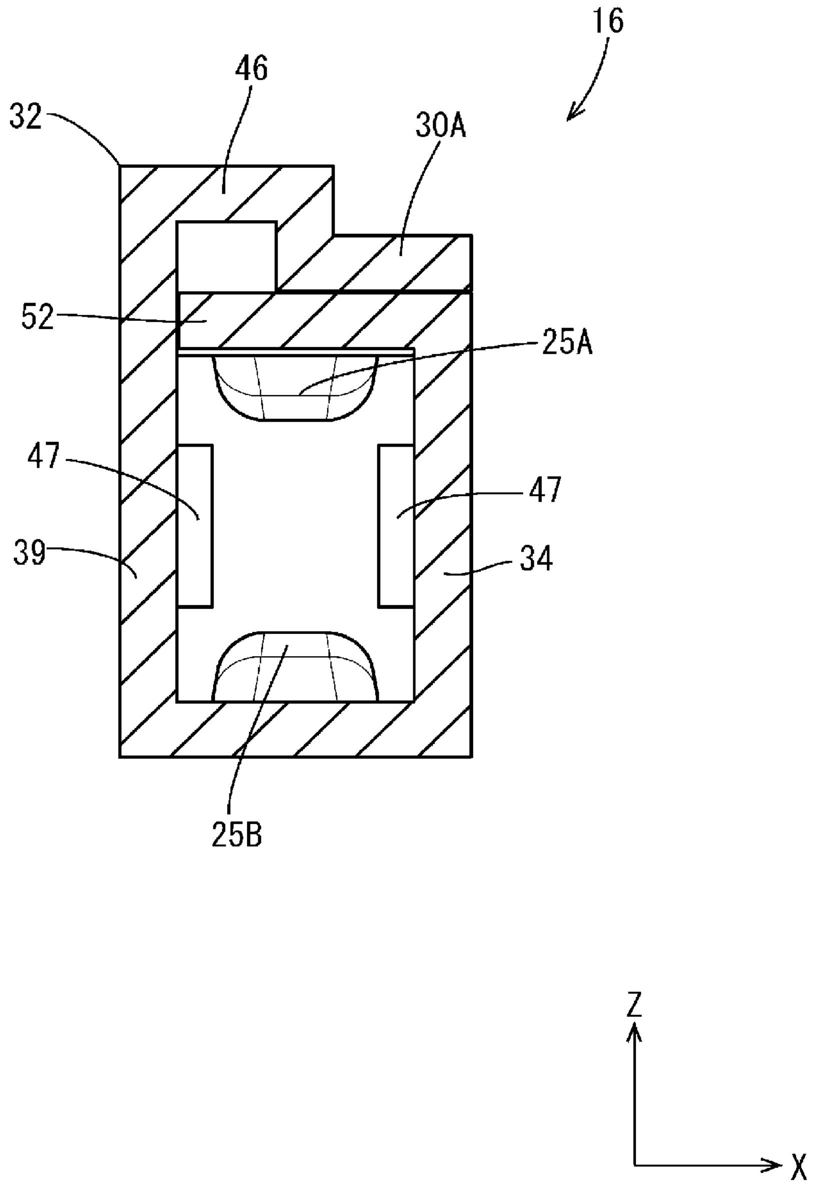
FIG. 5 is a section cut by a plane including a line V-V in FIG. 4 and orthogonal to a front-rear direction.

As shown in FIG. 5, the first upper wall 30A is formed to extend leftward from a center in the front-rear direction of an upper end part of the right side wall 39. The right side wall 39 and the first upper wall 30A are connected via a first bent portion 32. The first bent portion 32 couples the right side wall 39 and the first upper wall 30A with the right side wall 39 and the first upper wall 30A bent substantially at a right angle.

As shown in FIG. 5, a first overlapping portion 52 formed to extend rightward from a center in the front-rear direction, out of an upper end part of the left side wall 34 is formed below the first upper wall 30A. The first upper wall 30A and the first overlapping portion 52 are formed into rectangular shapes having substantially the same size when viewed from above.

Figure 6:
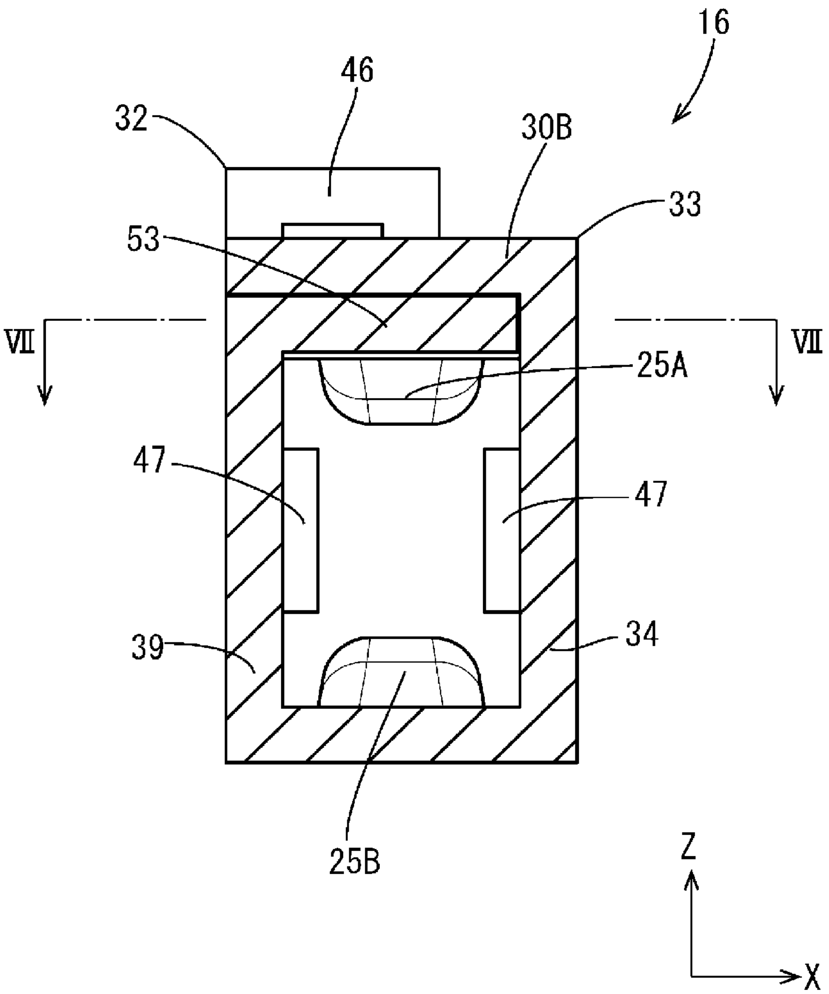
FIG. 6 is a section cut by a plane including a line VI-VI in FIG. 4 and orthogonal to the front-rear direction.

As shown in FIG. 6, the left side wall 34 and the second upper wall 30B are connected via a second bent portion 33. The second bent portion 33 couples the left side wall 34 and the second upper wall 30B with the left side wall 34 and the second upper wall 30B bent substantially at a left angle. A recess 56 recessed rearward from a front end part is formed on the right side edge of the second upper wall 30B. A front holding portion 55 provided on an upper end part of the right side wall 39 is disposed in this recess 56. The front holding portion 55 is shaped to project upward from a region corresponding to the recess 56, out of the upper end part of the right side wall 39.

Figure 7:
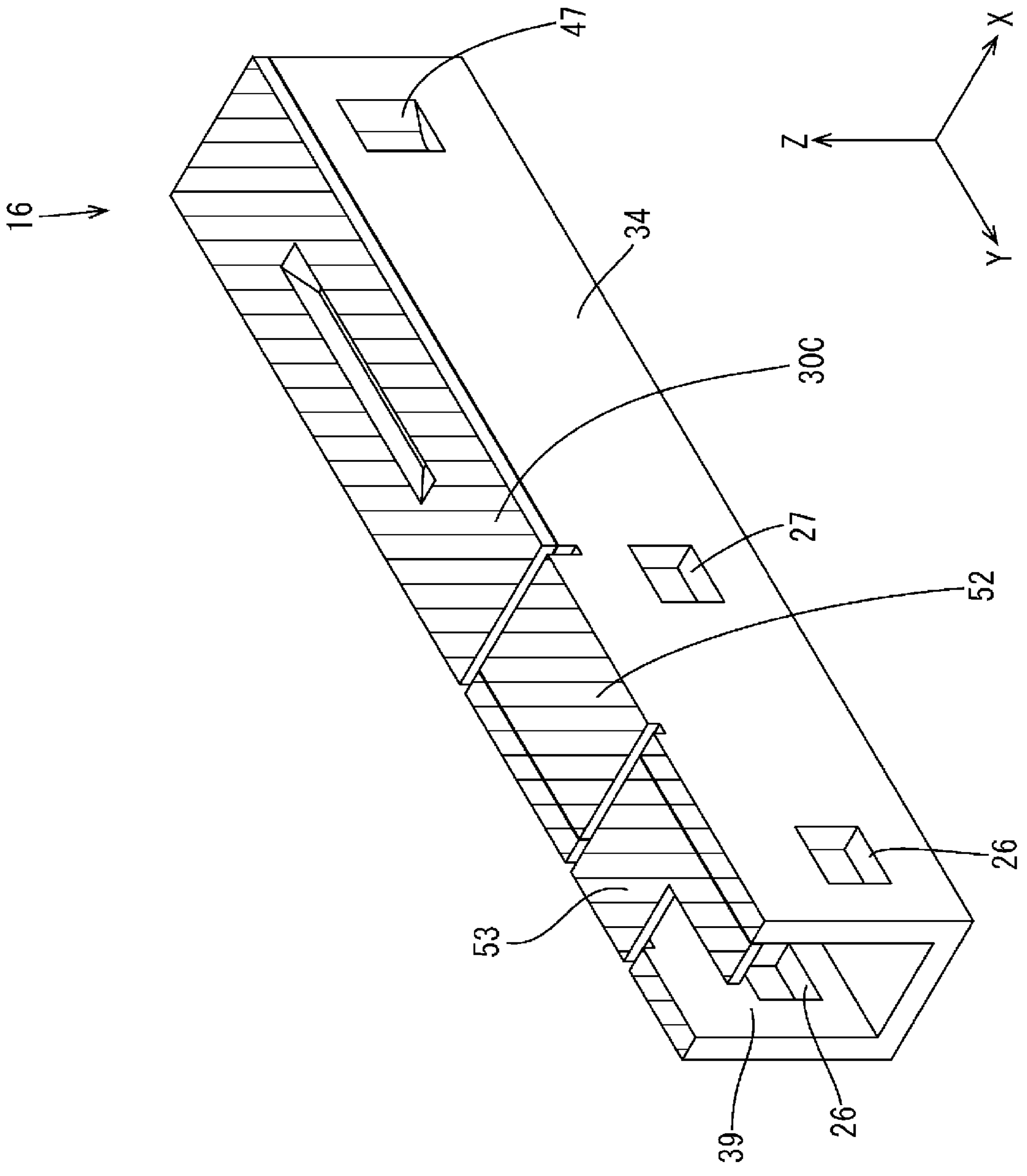
FIG. 7 is a perspective view showing a cross-section cut by a plane including a line VII-VII in FIG. 6 and orthogonal to a vertical direction.

As shown in FIG. 7, a second overlapping portion 53 shaped to extend leftward from a part behind the front holding portion 55, out of the upper end part of the right side wall 39, is provided below the second upper wall 30B. A left end part of the second overlapping portion 53 serves as an extending portion formed to extend forward. The front end edge of the extending portion is formed to be flush with the front end edge of the slide portion 16.

The third upper wall 30C is formed to extend leftward from a part behind the first bent portion 32, out of the upper end part of the right side wall 39.

As shown in FIG. 2, a lower pressurizing portion 25B (an example of a pressurizing portion) projecting upward is provided on the upper surface of the lower wall 31 of the slide portion 16. An upper pressurizing portion 25A (an example of the pressurizing portion) projecting downward is provided in a substantially half region in a forward direction from the rear end of the slide portion 16 below the third upper wall 30C of the slide portion 16.

As shown in FIG. 4, the partial lock receiving portions 26 are open at positions near front end parts in the front-rear direction on the left and right side walls 34, 39 of the slide portion 16. Further, the full lock receiving portions 27 are open at positions behind the partial lock receiving portions 26 on the left and right side walls 34, 39 of the slide portion 16. The partial lock receiving portions 26 and the full lock receiving portions 27 are resiliently lockable to the locking projections 28 provided on the left and right side walls of the terminal body 15.

Figure 8:
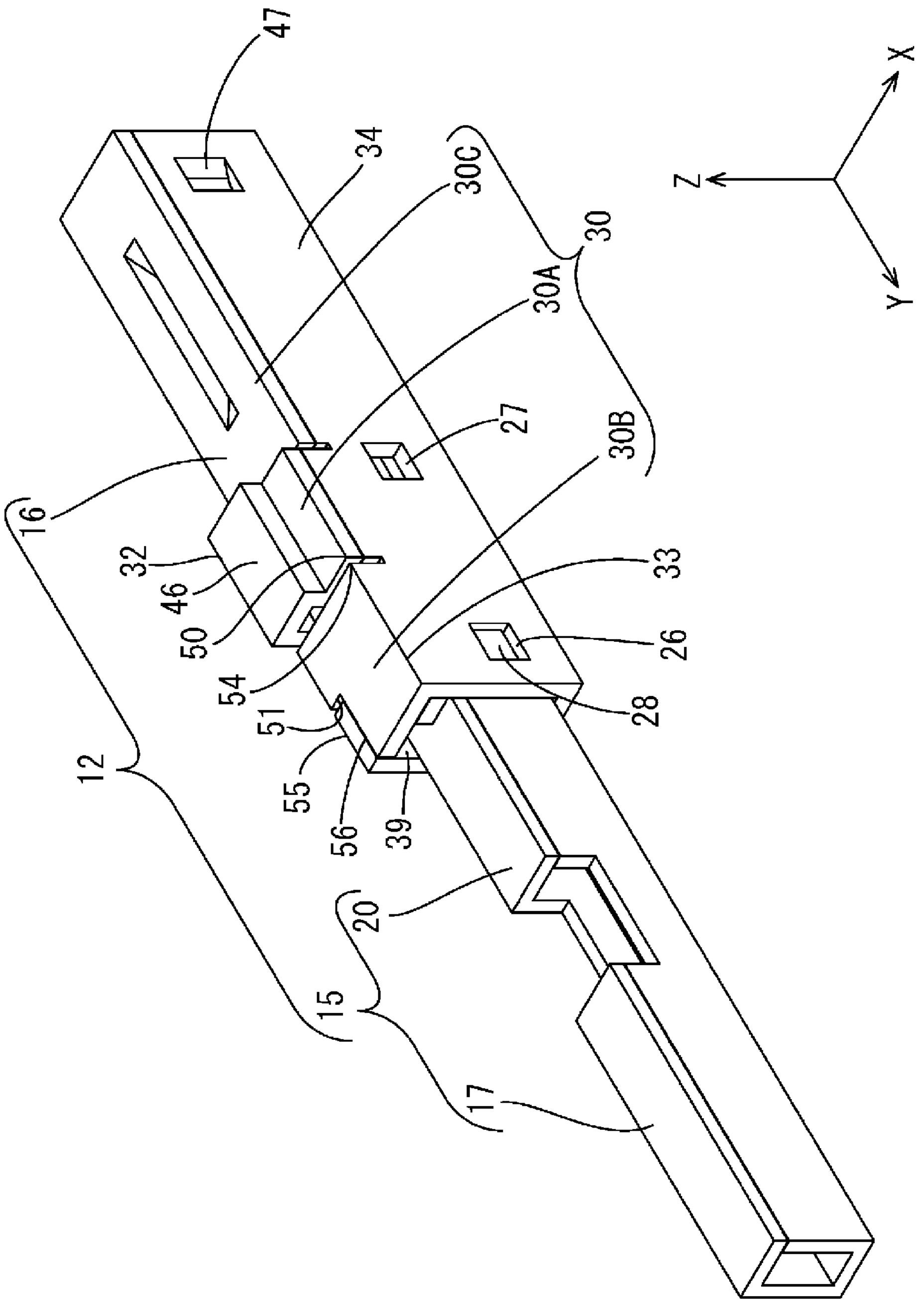
FIG. 8 is a perspective view showing a state where terminal body and the slide portion are partially locked.

With the locking projections 28 of the terminal body 15 and the partial lock receiving portions 26 of the slide portion 16 locked, the slide portion 16 is held at the partial locking position with respect to the terminal body 15 (see FIG. 8). In this state, the upper and lower pressurizing portions 25A, 25B of the slide portion 16 are located behind the rear end edges of the upper and lower sandwiching portions 18A, 18B of the terminal body 15. In this way, the upper and lower pressurizing portions 25A, 25B are respectively not in contact with the upper and lower sandwiching portions 18A, 18B and are separated rearward therefrom. Further, in this state, an interval between the upper and lower sandwiching portions 18A, 18B is set larger than a diameter of the core wire 13 (see FIG. 9).

With the locking projections 28 of the terminal body 15 and the full lock receiving portions 27 of the slide portion 16 locked, the slide portion 16 is located at the full locking position with respect to the terminal body 15. As shown in FIG. 2, in this state, the upper pressurizing portion 25A of the slide portion 16 is in contact with the upper sandwiching portion 18A from above the upper sandwiching portion 18A. Further, the lower pressurizing portion 25B of the slide portion 16 is in contact with the lower sandwiching portion 18B from below the lower sandwiching portion 18B.

As described above, the slide portion 16 is slidable in the front-rear direction between the partial locking position and the full locking position while being externally fit to the region of the terminal body 15 where the upper and lower sandwiching portions 18A, 18B are provided.

As shown in FIG. 2, with the slide portion 16 held at the full locking position with respect to the terminal body 15, the upper pressurizing portion 25A presses the upper sandwiching portion 18A from above, whereby the upper sandwiching portion 18A is deformed downward. Further, the lower pressurizing portion 25B presses the lower sandwiching portion 18B from below, whereby the lower sandwiching portion 18B is deformed upward. In this way, the core wire 13 is sandwiched in the vertical direction by the resiliently deformed upper and lower sandwiching portions 18A, 18B with the core wire 13 disposed to extend in the front-rear direction in a space between the upper and lower sandwiching portions 18A, 18B and the slide portion 16 held at the full locking position with respect to the terminal body 15. That is, the upper sandwiching portion 18A contacts the core wire 13 from above by being pressed downward by the upper pressurizing portion 25A, and the lower sandwiching portion 18B contacts the core wire 13 from below by being pressed upward by the lower pressurizing portion 25B.

As shown in FIG. 2, with the slide portion 16 held at the full locking position with respect to the terminal body 15, the upper holding protrusion 23A of the upper sandwiching portion 18A presses the core wire 13 from above and the lower holding protrusion 23B of the lower sandwiching portion 18B presses the core wire 13 from below. In this way, the core wire 13 is pressed from above by the upper holding protrusion 23A and pressed from below by the lower holding protrusion 23B disposed at a position shifted in the front-rear direction from the upper holding protrusion 23A, thereby being held in a state bent in the vertical direction. Further, the core wire 13 and the terminal 12 are electrically connected also by the upper and lower holding protrusions 23A, 23B.

As shown in FIG. 8, a pair of guiding portions 47 projecting inwardly of the slide portion 16 are provided at positions near a rear end part of the slide portion 16 on the left and right side walls 34, 39. The guiding portions 47 are formed to become narrower from rear to front. The core wire 13 is guided into the slide portion 16 by sliding in contact with the inner surfaces of the guiding portions 47.

The first upper wall 30A is formed by bending leftward a part near the center in the front-rear direction of the upper edge part of the right side wall 39 of the slide portion 16. The first upper wall 30A has a substantially rectangular shape when viewed from above.

As shown in FIG. 4, a projecting portion 46 projecting upward is provided in a right region of the first upper wall 30A. In other words, the projecting portion 46 is formed near the first bent portion 32 of the first upper wall 30A. The projecting portion 46 according to this embodiment is formed continuously with the first bent portion 32. The projecting portion 46 is formed by bending the first upper wall 30A. The projecting portion 46 is formed to extend in the front-rear direction from a front end part to a rear end part of the first upper wall 30A. When viewed from behind, the projecting portion 46 is in the form of a rectangular groove open downward. The projecting portion 46 is formed to have a uniform thickness. The uniform thickness means not only a strictly uniform thickness, but also a thickness substantially regarded as uniform even if not being strictly uniform. In other words, the projecting portion 46 is not formed with an extremely thin part. The slide portion 16 is movable forward by pushing the projecting portion 46 forward.

A structure for pushing the projecting portion 46 is not particularly limited. For example, a known jig 45 can be used. Further, without limitation to the jig 45, the projecting portion 46 may be, for example, pushed by a manufacturing facility provided with an actuator for pushing the projecting portion 46.

As shown in FIG. 4, a part near a left end part of the front end edge of the first upper wall 30A serves as a first contact portion 50 for contacting the rear end edge of the second bent portion 33 when the projecting portion 46 is pushed from behind by the jig 45. On the other hand, the rear end edge of the second bent portion 33 serves as a rear holding portion 54. If the projecting portion 46 is pushed from behind by the jig 45, the first contact portion 50 contacts the rear holding portion 54 from behind, whereby a force for pushing the projecting portion 46 of the first upper wall 30A from behind is received by the rear holding portion 54.

As shown in FIG. 4, a rear end part of the recess 56 formed on the second upper wall 30B serves as a second contact portion 51 for contacting the front holding portion 55 from behind when the first contact portion 50 contacts the rear holding portion 54 of the second upper wall 30B from behind. The second contact portion 51 is located behind the front holding portion 55.

[Connection Process of Wire 11 and Terminal 12]

Next, an example of a connection process of the wire 11 and the terminal 12 is described. The connection process of the wire 11 and the 12 is not limited to the one described below.

The terminal body 15 and the slide portion 16 are formed by a known method. The slide portion 16 is assembled with the terminal body 15 from behind. The front end edge of the slide portion 16 comes into contact with the locking projections 28 of the terminal body 15 from behind and the side walls of the slide portion 16 are expanded and deformed. If the slide portion 16 is further pushed forward, the side walls of the slide portion 16 are restored and the partial lock receiving portions 26 of the slide portion 16 are locked to the locking projections 28 of the terminal body 15. In this way, the slide portion 16 is held at the partial locking position with respect to the terminal body 15 (see FIG. 8). In this way, the terminal 12 is obtained.

The core wire 13 of the wire 11 is exposed by stripping the insulation coating 14 by a known method.

Figure 9:
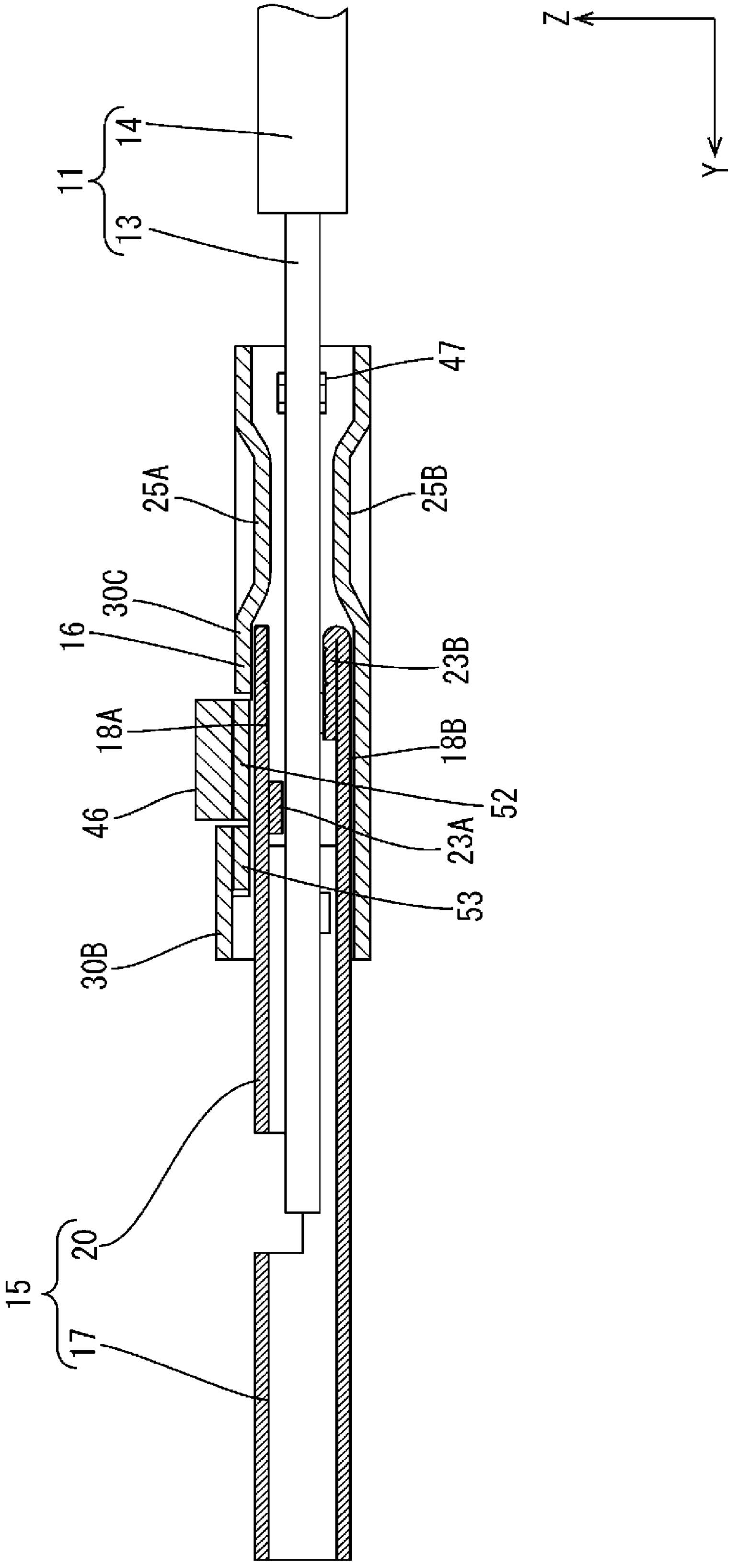
FIG. 9 is a side view in section showing a state where a core wire of a wire is inserted in the terminal body and the slide portion with the terminal body and the slide portion partially locked.

As shown in FIG. 9, if the wire 11 is pushed forward through the rear end part of the slide portion 16, a front end part of the core wire 13 is introduced into the slide portion 16. The core wire 13 comes into contact with the guiding portions 47 of the slide portion 16, thereby being guided into the slide portion 16. If the wire 11 is further pushed forward, the front end part of the core wire 13 enters the terminal body 15 and reaches the space between the upper and lower sandwiching portions 18A, 18B.

With the slide portion 16 held at the partial locking position with respect to the terminal body 15, the interval between the upper and lower sandwiching portions 18A, 18B is set larger than the outer diameter of the core wire 13.

Figure 10:
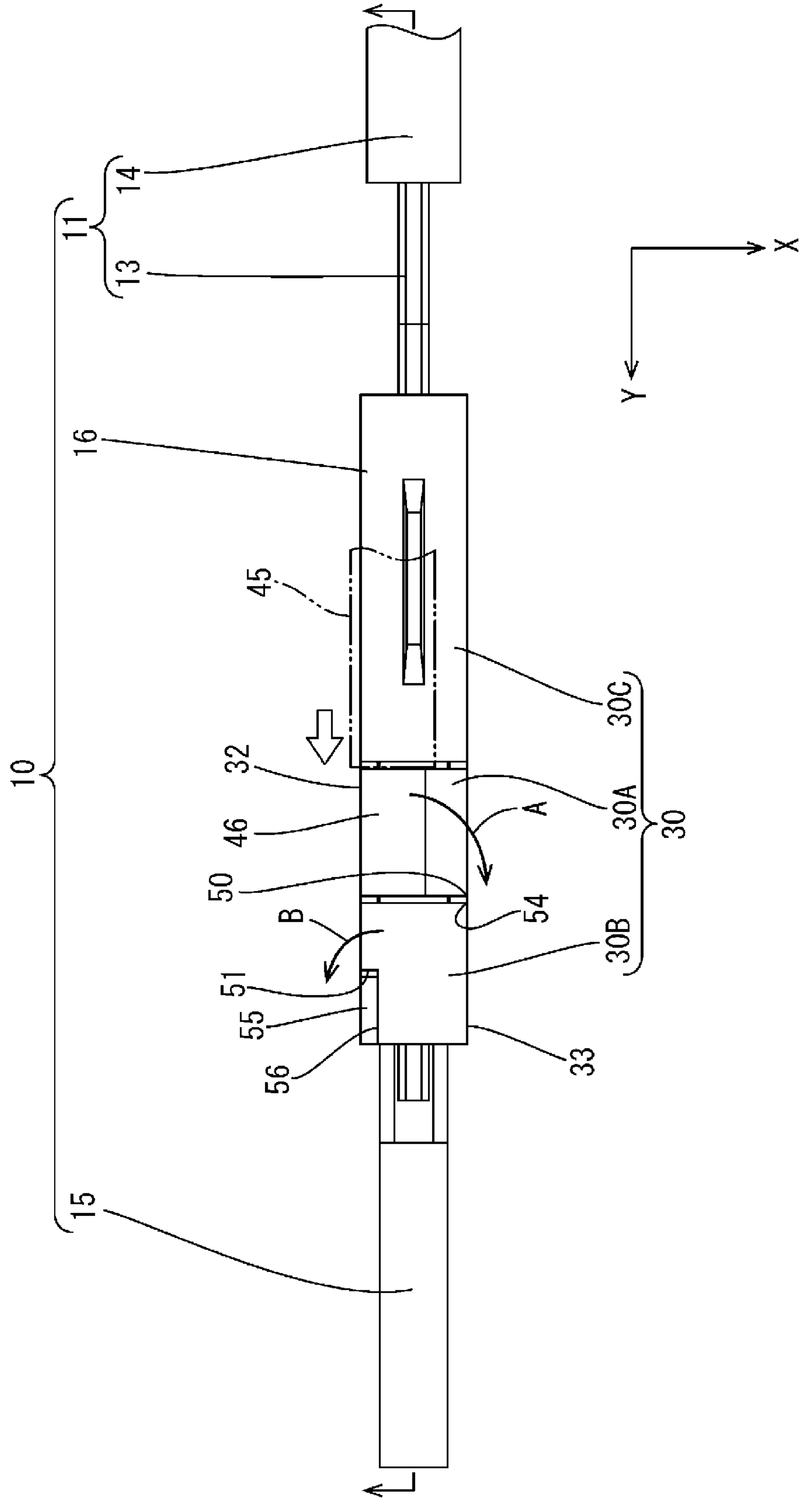
FIG. 10 is a plan view showing the wire with terminal.

Subsequently, as shown in FIG. 10, the jig 45 is brought into contact with the projecting portion 46 from behind to slide the slide portion 16 forward. The slide portion 16 is moved relatively forward with respect to the terminal body 15. At this time, the locking of the locking projections 28 of the terminal body 15 and the partial lock receiving portions 26 of the slide portion 16 is released and the side walls of the slide portion 16 ride on the locking projections 28 to be expanded and deformed.

If the slide portion 16 is moved forward, the side walls of the slide portion 16 are restored and the locking projections 28 of the terminal body 15 and the full lock receiving portions 27 of the slide portion 16 are resiliently locked. In this way, the slide portion 16 is held at the full locking position with respect to the terminal body 15.

As shown in FIG. 9, successively from a front side, the second overlapping portion 53 is disposed below the second upper wall 30B and the first overlapping portion 52 is disposed below the first upper wall 30A. The lower surface of the second overlapping portion 53, that of the first overlapping portion 52 and that of a front end part of the third upper wall 30C are formed to be substantially flush with each other. In this way, the upper sandwiching portion 18A is guided by the lower surface of the second overlapping portion 53 and that of the first overlapping portion 52 inside the slide portion 16 and smoothly moves to the lower surface of the front end party of the third upper wall 30C.

With the slide portion 16 held at the full locking position with respect to the terminal body 15, the upper pressurizing portion 25A of the slide portion 16 comes into contact with the upper sandwiching portion 18A of the terminal body 15 from above and presses the upper sandwiching portion 18A downward. Further, the lower pressurizing portion 25B of the slide portion 16 comes into contact with the lower sandwiching portion 18B of the terminal body 15 from below and presses the lower sandwiching portion 18B upward. In this way, the core wire 13 is vertically sandwiched by the upper and lower sandwiching portions 18A, 18B.

As shown in FIG. 2, the core wire 13 is sandwiched by the lower surface of the upper sandwiching portion 18A and the upper surface of the lower sandwiching portion 18B, whereby the oxide film formed on the surface of the core wire 13 is peeled to expose the metal surface constituting the core wire 13. By the contact of this metal surface with the upper and lower sandwiching portions 18A, 18B, the wire 11 and the terminal 12 are electrically connected.

In a state vertically sandwiched by the upper and lower sandwiching portions 18A, 18B, the core wire 13 is sandwiched by the upper holding protrusion 23A of the upper sandwiching portion 18A and the lower holding protrusion 23B of the lower sandwiching portion 18B, thereby being held in a state extending in the front-rear direction and bent in the vertical direction. In this way, the core wire 13 can be firmly held, wherefore a holding force for the wire 11 and the terminal 12 can be enhanced if a pulling force acts on the wire 11. In this way, the wire with terminal 10 is completed.

Functions and Effects of Embodiment

Next, functions and effects of this embodiment are described. The terminal 12 according to this embodiment is connected to the front end part of the wire 11 and includes the terminal body 15 and the slide portion 16. The terminal body 15 includes the upper and lower sandwiching portions 18A, 18B for sandwiching the wire 11. The slide portion 16 has a tubular shape to be externally fit to the terminal body 15. The slide portion 16 includes the upper and lower pressurizing portions 25A, 25B projecting inwardly from the inner surface of the slide portion 16. The slide portion 16 is slidable with respect to the terminal body 15 between the partial locking position where the upper and lower pressurizing portions 25A, 25B are not in contact with the upper and lower sandwiching portions 18A, 18B and the full locking position which is forward of the partial locking position and where the upper and lower pressurizing portions 25A, 25B are in contact with the upper and lower sandwiching portions 18A, 18B. The slide portion 16 has the lower wall 31, the right side wall 39 extending upward from the right side edge of the lower wall 31 and the left side wall 34 extending upward from the left side edge of the lower wall 31. The first upper wall 30A extending toward the left side wall 34 via the bent first bent portion 32 is formed on the upper end part of the right side wall 39. The second upper wall 30B extending toward the right side wall 39 via the bent second bent portion 33 is formed at the position forward of the first upper wall 30A on the upper end part of the left side wall 34. The first upper wall 30A is formed with the projecting portion 46 projecting outward. The rear holding portion 54 for receiving a force pressing the projecting portion 46 of the first upper wall 30A from behind is provided on the rear end edge of the second upper wall 30B or the rear end edge of the second bent portion 33.

Further, the wire with terminal 10 according to this embodiment includes the above terminal 12 and the wire 11 to be connected to the terminal 12.

As shown in FIG. 10, if the projecting portion 46 is pushed forward by the jig 45, the first upper wall 30A provided with the projecting portion 46 is pushed forward. Then, the entire first upper wall 30A is pushed forward and the front end edge of the first upper wall 30A contacts the rear holding portion 54 from behind. In this way, a force applied to the first upper wall 30A when the jig 45 pushes the projecting portion 46 forward is received by the rear holding portion 54 of the second upper wall 30B. In this way, the strength of the slide portion 16 can be improved.

According to this embodiment, the rear holding portion 54 includes the rear end edge of the second bent portion 33 and an end part on the side of the left side wall 34, out of the front end edge of the first upper wall 30A, serves as the first contact portion 50 for contacting the rear end edge of the second bent portion 33 when the projecting portion 46 of the first upper wall 30A is pushed from behind.

The first upper wall 30A is connected to the right side wall 39 via the first bent portion 32 extending in the front-rear direction. Thus, the first upper wall 30A cannot move straight forward even if being pushed from behind by the jig 45. Specifically, the rear end part of the first bent portion 32 functions like a support point and substantially turns in a direction indicated by an arrow A when viewed from above. Since the first bent portion 32 extends in the front-rear direction as described above, the first upper wall 30A does not make a perfectly circular motion. Further, the rear end part of the first bent portion 32 does not serve as an exact center of rotation.

If the first upper wall 30A is pushed from behind by a pressing portion, the first contact portion 50 formed on the side of the left side wall 34, out of the front end edge of the first upper wall 30A, comes into contact with the rear holding portion 54 of the second upper wall 30B from behind. Since the second bent portion 33 is bent, the strength of the second bent portion 33 is higher than those of the left side wall 34 and the second upper wall 30B. In this way, the strength of the slide portion 16 can be improved.

According to this embodiment, the front holding portion 55 projecting upward is formed at the position forward of the first bent portion 32 on the upper end edge of the right side wall 39, the second upper wall 30B is provided with the second contact portion 51 behind the front holding portion 55, and a force applied to the rear holding portion 54 of the second upper wall 30B is received by the second contact portion 51 coming into contact with the front holding portion 55 from behind.

If the rear holding portion 54 of the second upper wall 30B is pushed from behind by the first contact portion 50 of the first upper wall 30A, the second upper wall 30B entirely moves forward. In particular, since the second upper wall 30B and the left side wall 34 are coupled by the second bent portion 33 extending in the front-rear direction, the second upper wall 30B cannot move straight forward. Specifically, the rear end part of the second bent portion 33 functions like a support point and moves to substantially turn in a direction indicated by an arrow B when viewed from above. Since the second bent portion 33 extends in the front-rear direction as described above, the second upper wall 30B does not make a perfectly circular motion. Further, the rear end part of the second bent portion 33 does not serve as an exact center of rotation.

If the rear holding portion 54 is pushed from behind by the first contact portion 50, the second contact portion 51 formed on the side of the left side wall 34, out of the second upper wall 30B, comes into contact with the front holding portion 55 of the first upper wall 30A from behind. Since a force received by the second contact portion 51 is received by the front holding portion 55 in this way, the strength of the slide portion 16 can be improved.

According to this embodiment, the projecting portion 46 is formed near the first bent portion 32.

If the projecting portion 46 is pushed forward from behind by the jig 45, the first upper wall 30A moves to substantially turn when viewed from above since the rear end part of the first bent portion 32 functions like a support point. Since the projecting portion 46 is formed near the first bent portion 32 functioning like a support point, the first upper wall 30A hardly turns when the projecting portion 46 is pushed from behind. In this way, the strength of the slide portion 16 can be improved.

According to this embodiment, the projecting portion 46 is formed by bending the first upper wall 30A.

Since the projecting portion 46 is formed by bending the first upper wall 30A, a part where a thickness of the metal plate material constituting the projecting portion 46 is thinner than other parts is hardly formed. Since the strength of the projecting portion 46 can be improved in this way, the strength of the slide portion 16 can be improved.

According to this embodiment, the slide portion 16 has the third upper wall 30C behind the first upper wall 30A, and the third upper wall 30C is provided with the upper pressurizing portion 25A.

If the projecting portion 46 formed on the first upper wall 30A is pushed from behind, a force applied to this projecting portion 46 is received by the second upper wall 30B located forward of the first upper wall 30A. On the other hand, by providing the third upper wall 30C with the upper pressurizing portion 25A for pressing the sandwiching portion 18A, a force applied from the sandwiching portion 18A to the upper pressurizing portion 25A is received by the third upper wall 30C. In this way, a force applied to the slide portion 16 can be dispersed as compared to the case where a force received by the projecting portion 46 and a force received by the upper pressurizing portion 25A are received by one upper wall. In this way, the strength of the slide portion 16 can be improved.

Other Embodiments (1) Although the projecting portion 46 is provided at the position near the right end part of the first upper wall 30 in the above embodiment, there is no limitation to this and the projecting portion 46 may be provided near a center of the first upper wall 30A in a lateral direction.

(2) The projecting portion 46 may be formed by striking the first upper wall 30A upward.

(3) The rear holding portion 54 may be formed on the rear end edge of the second upper wall 30B and may not be formed on the second bent portion 33. Further, the rear holding portions 54 may be formed on both the rear end edge of the second upper wall 30B and the rear end edge of the second bent portion 33.

(4) The front holding portion 55 may be omitted.

(5) The locking projections 28, the partial lock receiving portions 26 and the full lock receiving portions 27 may be omitted.

(6) Although the terminal 12 according to the above embodiment is a female terminal, there is no limitation to this and the terminal 12 may be a so-called male terminal.

LIST OF REFERENCE NUMERALS

10: wire with terminal
11: wire
12: terminal
13: core wire
14: insulation coating
15: terminal body
16: slide portion
17: tube portion
18A: upper sandwiching portion
18B: lower sandwiching portion
20: wire connecting portion
23A: upper holding protrusion
23B: lower holding protrusion
25A: upper pressurizing portion
25B: lower pressurizing portion
26: partial lock receiving portion
27: full lock receiving portion
28: locking projection
30: upper wall
30A: first upper wall
30B: second upper wall
30C: third upper wall
31: lower wall
32: first bent portion
33: second bent portion
34: left side wall (example of second side wall)
39: right side wall (example of first side wall)
45: jig
46: projecting portion
47: guiding portion
50: first contact portion
51: second contact portion
52: first overlapping portion
53: second overlapping portion
54: rear holding portion
55: front holding portion
56: recess

What is claimed is:

1. A terminal to be connected to a front end part of a wire, comprising:

a terminal body; and a slide portion, wherein:

the terminal body includes a sandwiching portion for sandwiching the wire, the slide portion has a tubular shape to be externally fit to the terminal body, the slide portion includes a pressurizing portion projecting inward from an inner surface of the slide portion, the slide portion is slidable with respect to the terminal body between a non-contact position where the pressurizing portion is not in contact with the sandwiching portion and a contact position forward of the non-contact position, the pressurizing portion being in contact with the sandwiching portion at the contact position, the slide portion has a lower wall, a first side wall extending upward from one side edge of the lower wall and a second sandwiching portion extending upward from the other side edge of the lower wall, a first upper wall extending toward the second side wall via a first bent portion is formed on an upper end part of the first side wall and a second upper wall extending toward the first side wall via a second bent portion formed at a position forward of the first upper wall on an upper end part of the second side wall, the first upper wall is formed with a projecting portion projecting outward, and a rear holding portion for receiving a force pushing the projecting portion of the first upper wall from behind is provided on a rear end edge of the second upper wall or a rear end edge of the second bent portion.

2. The terminal of claim 1, wherein:

the rear holding portion includes a rear end edge of the second bent portion, and an end part on the second side wall side, out of a front end edge of the first upper wall, serves as a first contact portion for contacting the rear end edge of the second bent portion when the projecting portion of the first upper wall is pushed from behind.

3. The terminal of claim 1, wherein:

a front holding portion projecting upward is formed at a position forward of the first bent portion on an upper end edge of the first side wall, a second contact portion is provided behind the front holding portion on the second upper wall, and a force applied to the rear holding portion of the second upper wall is received by the second contact portion coming into contact with the front holding portion from behind.

4. The terminal of claim 1, wherein the projecting portion is formed near the first bent portion.

5. The terminal of claim 1, wherein the projecting portion is formed by bending the first upper wall.

6. The terminal of claim 1, wherein the slide portion has a third upper wall behind the first upper wall, and the third upper wall is provided with a pressurizing portion.

7. A wire with terminal, comprising:

the terminal of claim 1; and a wire to be connected to the terminal.

* * * * *